(12) United States Patent
Gutelius et al.

(10) Patent No.: US 9,261,152 B2
(45) Date of Patent: Feb. 16, 2016

(54) COILED SPREADER SPRING

(71) Applicant: Akebono Brake Corporation, Farmington, MI (US)

(72) Inventors: Kenneth Eric Gutelius, Lake Orion, MI (US); Muhammad Farooq, Farmington Hills, MI (US)

(73) Assignee: AKEBONO BRAKE CORPORATION, Farmington Hills, MI (US)

( * ) Notice: Subject to any disclaimer, the term of this patent is extended or adjusted under 35 U.S.C. 154(b) by 256 days.

(21) Appl. No.: 13/893,515

(22) Filed: May 14, 2013

(65) Prior Publication Data

US 2014/0339026 A1    Nov. 20, 2014

(51) Int. Cl.
*F16D 65/097*    (2006.01)

(52) U.S. Cl.
CPC ........ *F16D 65/0973* (2013.01); *F16D 65/0972* (2013.01); *F16D 65/0976* (2013.01); *F16D 65/0977* (2013.01)

(58) Field of Classification Search
CPC ........... F16F 1/04; F16F 1/06; F16F 2236/08; F16F 2236/085; F16D 2055/0029; F16D 2055/0041; F16D 65/0975; F16D 65/0976
See application file for complete search history.

(56) References Cited

U.S. PATENT DOCUMENTS

| | | | | |
|---|---|---|---|---|
| 1,594,301 A * | 7/1926 | Heymer | ..................... | 267/155 |
| 2,621,917 A * | 12/1952 | Landers | ..................... | 267/155 |
| 2,867,842 A * | 1/1959 | Morton | ..................... | 16/256 |
| 2,973,805 A * | 3/1961 | Rowan | ..................... | 267/142 |
| 3,056,472 A * | 10/1962 | Dobbelstein et al. | ........ | 188/72.3 |
| 3,658,160 A * | 4/1972 | Beller et al. | ............... | 188/73.47 |
| 4,055,237 A * | 10/1977 | Numazawa et al. | ....... | 188/73.35 |
| 4,119,180 A * | 10/1978 | Horie | ..................... | 188/73.38 |
| 4,364,455 A | 12/1982 | Oshima | | |
| 4,491,204 A | 1/1985 | Dirauf et al. | | |
| 4,658,938 A | 4/1987 | Thiel et al. | | |
| 4,666,025 A | 5/1987 | Rubin | | |
| 4,787,485 A * | 11/1988 | Hosokawa | ................. | 188/24.12 |
| 4,969,540 A | 11/1990 | Cartwright et al. | | |
| 5,069,313 A | 12/1991 | Kato et al. | | |
| 5,249,647 A | 10/1993 | Kobayashi et al. | | |
| 5,251,727 A | 10/1993 | Loeffler et al. | | |
| 5,511,638 A | 4/1996 | Tsuruta | | |
| 5,538,103 A | 7/1996 | Rueckert et al. | | |
| 5,549,181 A | 8/1996 | Evans | | |

(Continued)

FOREIGN PATENT DOCUMENTS

| | | |
|---|---|---|
| EP | 2299142 A1 | 3/2011 |
| GB | 2172068 A | 9/1986 |

(Continued)

OTHER PUBLICATIONS

Potentially related U.S. Appl. No. 13/861,549, filed Apr. 12, 2013.

*Primary Examiner* — Bradley King
(74) *Attorney, Agent, or Firm* — The Dobrusin Law Firm, P.C.

(57) ABSTRACT

A spreader spring comprising: (a) a locking arm that connects the spreader spring to a brake component; (b) a retraction arm; and (c) a bias device located between the locking arm and the retraction arm; wherein the bias device includes six helical loops or more that store energy during a brake apply and once the brake apply is complete assist in retracting a brake pad.

28 Claims, 13 Drawing Sheets

(56) References Cited

U.S. PATENT DOCUMENTS

| | | | |
|---|---|---|---|
| 5,901,815 | A | 5/1999 | Kobayashi et al. |
| 5,934,417 | A | 8/1999 | Kobayashi et al. |
| 5,947,233 | A | 9/1999 | Kobayashi et al. |
| 6,378,665 | B1 | 4/2002 | McCormick et al. |
| 6,378,666 | B1 | 4/2002 | Yoko |
| D473,127 | S | 4/2003 | Yoko |
| D483,709 | S | 12/2003 | Byrd et al. |
| 6,719,105 | B1 | 4/2004 | Wemple |
| D489,655 | S | 5/2004 | Byrd et al. |
| 6,920,965 | B2 | 7/2005 | Burgdorf et al. |
| 6,959,792 | B2 | 11/2005 | Ashman et al. |
| 7,163,089 | B2 | 1/2007 | Nogiwa |
| 7,219,773 | B2 | 5/2007 | Ono |
| 7,308,974 | B2 | 12/2007 | Barbosa et al. |
| 7,455,153 | B2 | 11/2008 | Ooshima et al. |
| 7,467,693 | B2 | 12/2008 | Barbosa et al. |
| 8,020,674 | B2 | 9/2011 | Miura et al. |
| 8,393,441 | B2 | 3/2013 | Gutelius |
| 2002/0043436 | A1* | 4/2002 | Burgdorf et al. ........... 188/73.38 |
| 2002/0189911 | A1 | 12/2002 | Layton et al. |
| 2006/0070828 | A1 | 4/2006 | Hendrich et al. |
| 2007/0029148 | A1 | 2/2007 | Jedele |
| 2007/0251772 | A1 | 11/2007 | Tsurumi |
| 2011/0168503 | A1 | 7/2011 | Chelaidite |
| 2012/0186917 | A1* | 7/2012 | Gutelius ...................... 188/72.3 |
| 2012/0205205 | A1 | 8/2012 | Lethorn |
| 2013/0025981 | A1* | 1/2013 | Maehara et al. ............. 188/72.3 |

FOREIGN PATENT DOCUMENTS

| | | |
|---|---|---|
| JP | 56021633 U | 10/1981 |
| JP | 08-261261 A1 | 10/1996 |
| JP | 08-284983 A1 | 11/1996 |
| JP | 2001-336554 A | 12/2001 |
| WO | 2011/126125 A1 | 10/2011 |

* cited by examiner

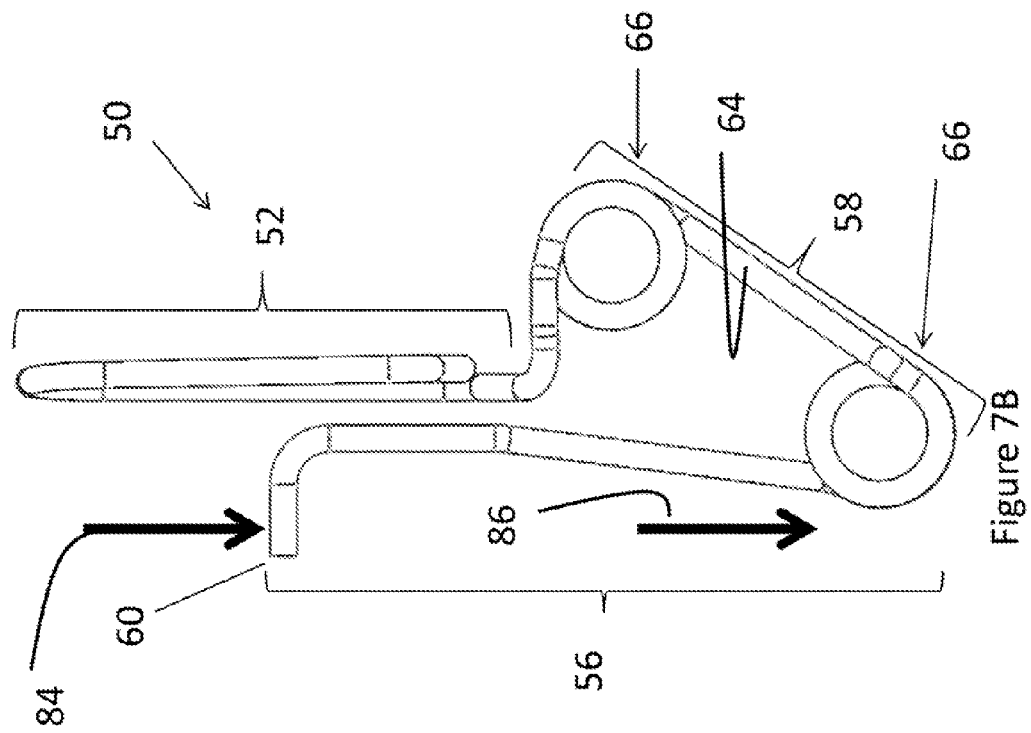
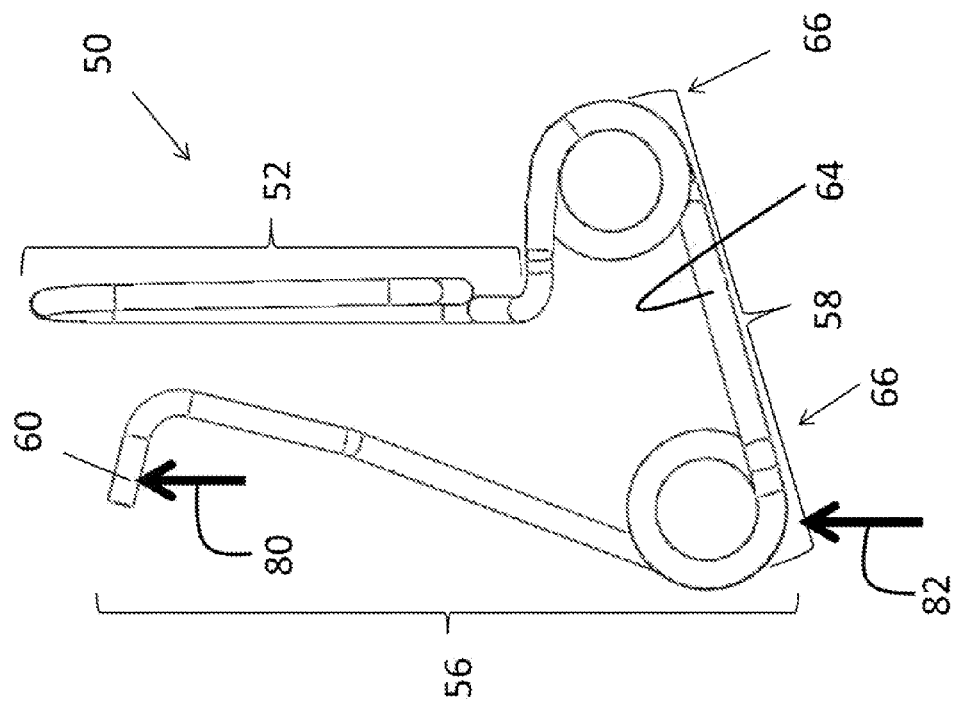

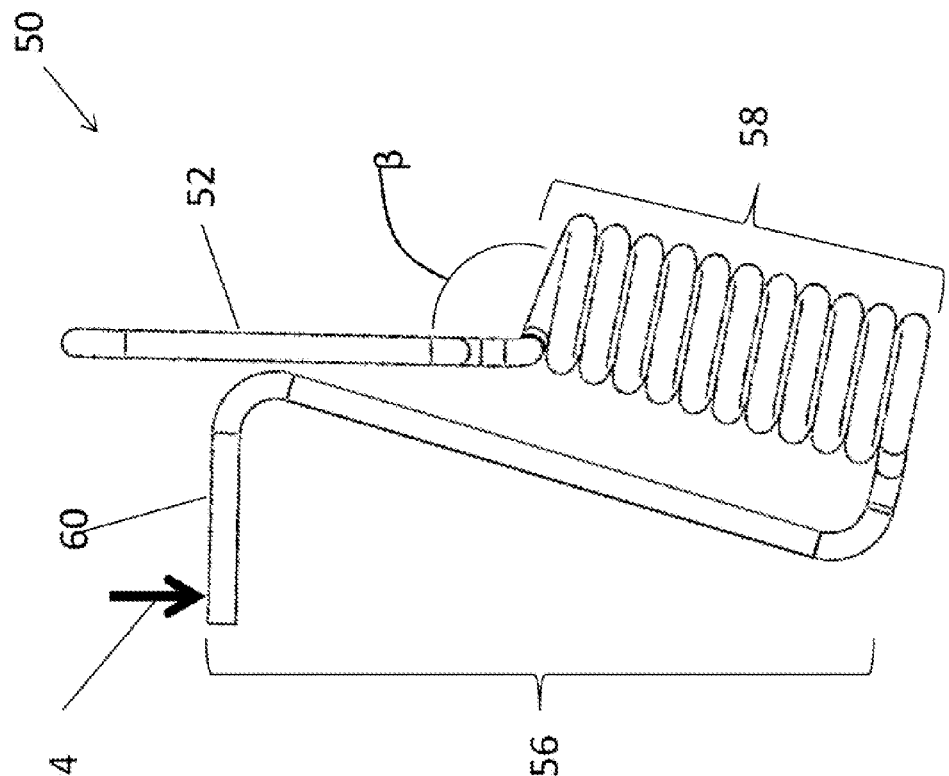
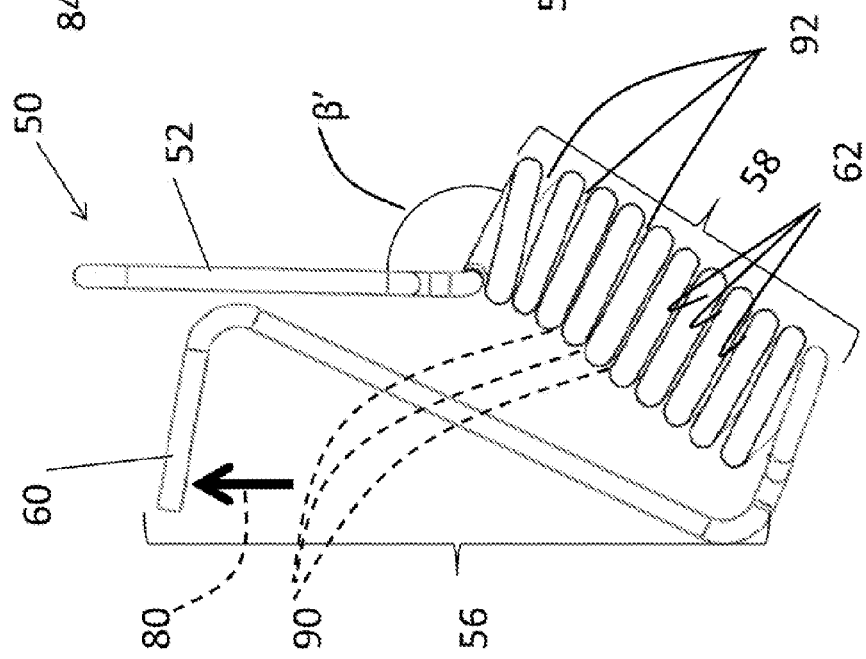

COILED SPREADER SPRING

FIELD OF THE INVENTION

The present invention generally relates to a brake system and more particularly a spreader spring that assists in retracting brake pads.

BACKGROUND OF THE INVENTION

Typical, disc brake systems include a support bracket, two more brake pads, a caliper, and a rotor. The at least two brake pads are mounted and located adjacent to the support bracket so that the brake pads move axially towards and away from the rotor. The disc brake system may include a pad clip that attaches to the support bracket and to a portion of the one or more brake pads so that the brake pads are held in the support bracket. The disc brake system may include one or more springs that attach to the brake pads to assist in retracting the brake pads. The addition of one or more clips and/or one or more springs may require modifications to be made to the support bracket, brake pads, caliper body, or a combination thereof so that the spring and/or pad clip may be used. In addition these springs may not be used with existing braking systems because the spring does not fit without the modifications discussed above. Examples of springs and pad retraction devices are disclosed in U.S. Pat. Nos. 4,364,455; 4,491,204; 5,249,647; 5,511,638; 5,537,103; 6,378,665; 6,920,965; 7,308,974; 7,467,693; and 8,393,441; U.S. Patent Application Publication No. 2002/0189911 and WO2011/126125 and Japanese Patent No. 56021633U all of which are expressly incorporated herein by reference for all purposes.

One problem faced by these springs is that they work with "new" brake designs, or brakes modified specifically for each design. These springs may not easily be added to existing systems when the brakes are changed so that the benefits of the spreader spring can be seen with used vehicles. These springs may require special pad clips, brake pads, pressure plates, support brackets, caliper housings, or other additional features so that the spreader spring is held in place.

Yet another problem of know springs is that some of the springs are "over the rotor" designs (i.e. the spring is placed directly over the rotor) and are subject to interference with moving parts such as the rotor or the wheel. For example, the spreader spring may contact the rotor, the caliper housing, or both and move out of contact with the brake pads, become damaged, or become tangled within other parts causing damage to the other parts such as the rotor, brake pads, fluid lines, tires, or a combination thereof. The over the rotor designs may require additional clips and/or support structures so that the spring does not contact other parts of the braking system, thus, adding expense to the brake system and preventing the spreader spring from being added to existing systems easily. Some over the rotor designs may require the caliper housing to be redesigned so that there is enough space for the spring to fit under the caliper housing.

Another such problem faced by known disk brake systems is lateral run out (LRO) and disk thickness variation (DTV). Each rotor will exhibit some LRO as the rotor rotates, and each rotor will have some variation in disk thickness. As the rotor moves the rotor may contact the brake pads at a high spot on the disk due to DVT, the rotor may contact the brake pads due to LRO, or both. After repeated contact with the brake pads a thin spot may be created in the disk, and this thin spot may further increase the variation in thickness across the disk otherwise known as "DVT growth." As a result of DVT growth the driver may perceive an increase in torque and pressure via pedal pulsation, steering wheel shake or "nibble," vibration of the vehicle, or a combination thereof. Thus, there is a need for a device that can be incorporated into known braking systems, which minimizes and/or eliminates DVT growth so that noise, vibration, & harshness (NVH) are reduced and/or eliminated. Thus, there is a need for a spreader spring that is light, strong, resistant to failure, and can be added into existing braking system without any modifications to the braking system and/or the spreader spring, or using other additional parts. Further, there is a need for a spreader spring that can attach to existing brake components with modification and/or addition of attachment points, connections, or both. It would be attractive to have a spreader spring that forms a removable connection with sufficient holding capabilities with one or more components of the brake system so that the spreader spring does not fall out during normal operation but can be added to the system during a brake pad change.

SUMMARY OF THE INVENTION

One possible embodiment of the present invention includes a spreader spring comprising: (a) a locking arm that connects the spreader spring to a brake component; (b) a retraction arm; and (c) a bias device located between the locking arm and the retraction arm; wherein the bias device includes six helical loops or more that store energy during a brake apply and once the brake apply is complete assist in retracting a brake pad.

A possible embodiment of the present invention includes a spreader spring comprising: (a) a locking arm that connects the spreader spring to a brake component, wherein the locking arm includes a bias lock so that the locking arm biases to form a connection with an abutment of a pad clip; (b) a retraction arm having a connection arm extending therefrom, wherein the connection arm forms a connection with a brake pad; and (c) a bias device located between the locking arm and the retraction arm; wherein the bias device includes eight helical loops or more that store energy during a brake apply and once the brake apply is complete assist in retracting a brake pad.

One unique aspect of the present invention envisions a spreader spring that can be incorporated into existing braking systems without the need for any modifications to the braking system, additional parts, adding expense, labor, or a combination thereof to the braking systems. The present invention does not require any additional holes and/or coupling areas in which contact with the pressure plates of the brake pads is made so that the spreader spring may assist in retracting the brake pads, thus, the present invention may be used with a significant number of existing brake pad designs. Further, the present invention fits outside of the caliper housing and extends laterally away from the caliper housing and brake rotor so that the spreader spring may be used regardless of the caliper housing employed by the braking system.

Another unique aspect of the present invention envisions spreader spring that may be used with a significant number of pad clips and or braking systems. The spreader spring may be incorporated around portions of and/or into portions of the pad clips so that vertical displacement (e.g., movement perpendicular to the face of the support bracket) of the spreader spring is minimized. The spreader spring may further extend through and/or around portions of the pad clip so that a portion of the spreader spring is in close proximity to and/or in contact with the support bracket so that movement is minimized and/or eliminated.

The teachings herein provide a device that can be incorporated into known braking systems, which minimizes and/or eliminates DVT growth so that noise, vibration, & harshness (NVH) are reduced and/or eliminated. The present teachings provide a spreader spring that is light, strong, resistant to failure, and can be added into existing braking system without any modifications to the braking system and/or the spreader spring, or using other additional parts. The present teachings provide a spreader spring that can attach to existing brake components with modification and/or addition of attachment points, connections, or both. Further, the present teachings provide a spreader spring that forms a removable connection with sufficient holding capabilities with one or more components of the brake system so that the spreader spring does not fall out during normal operation but can be added to the system during a brake pad change.

BRIEF DESCRIPTION OF THE DRAWINGS

FIG. 7A illustrates a top view of one example of a spreader spring during a brake apply;

FIG. 7B illustrates a top view of the spreader spring of FIG. 7A during running;

FIG. 12A illustrates a top view of one example of a spreader spring during a brake apply;

FIG. 12B illustrates a top view of the spreader spring of 12A during running.

DETAILED DESCRIPTION OF THE INVENTION

Figure 1:
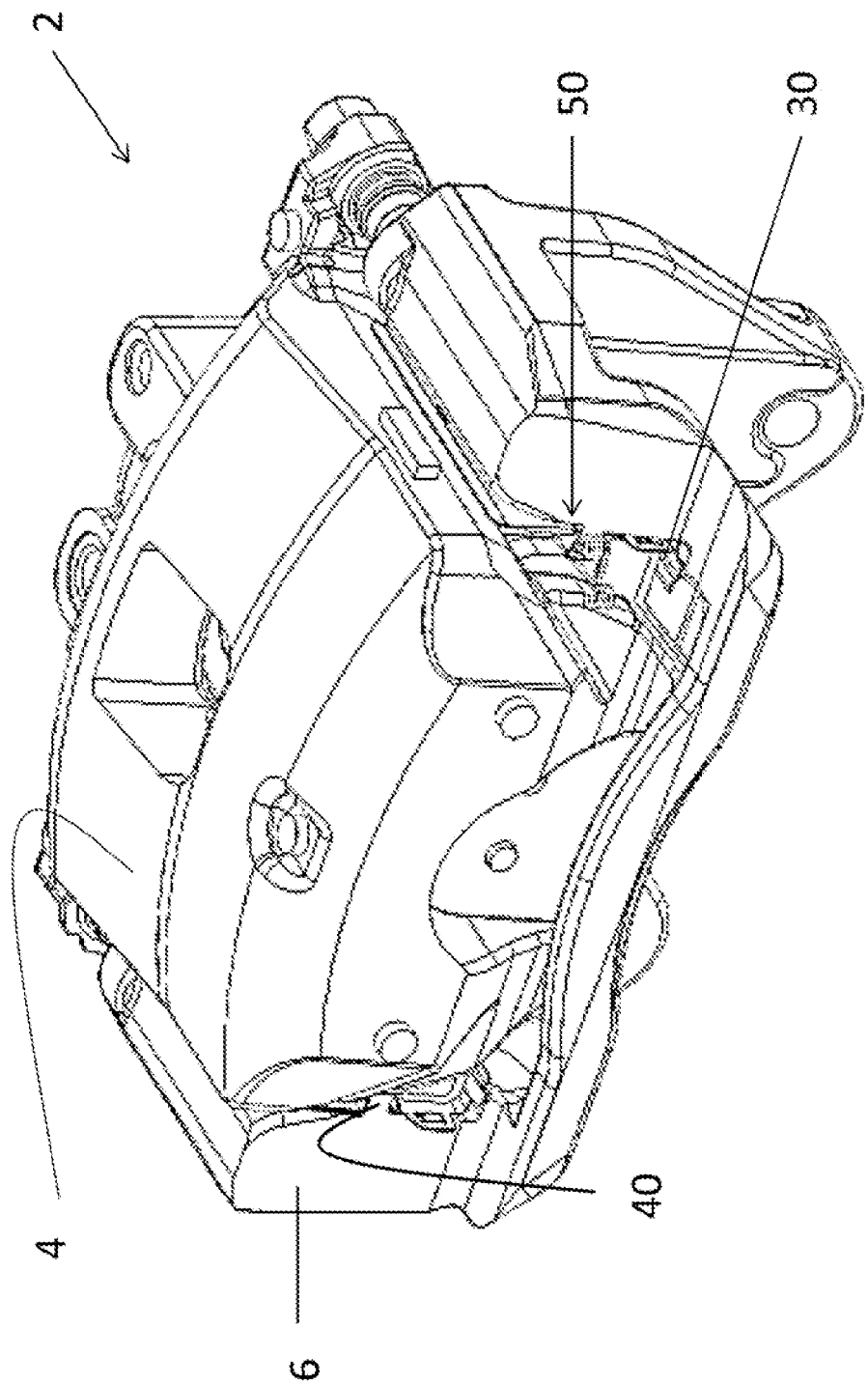
FIG. 1 illustrates a caliper including a spreader spring.

The following description of the preferred embodiment(s) is merely exemplary in nature and is in no way intended to limit the invention, its application, or uses.

The present invention is predicated upon providing an improved spreader spring for use with a brake assembly in vehicles. For example, the spreader spring may be used with almost any brake assembly and the brake assembly may be used with almost any vehicle (e.g. car, truck, bus, train, airplane, or the like). Alternatively, the spreader spring and brake assembly may be integrated into components used for manufacturing or other equipment that require a brake such as a lathe, winder for paper products or cloth, amusement park rides, wind turbines, the like, or a combination thereof. However, the present invention is most suitable for use with a passenger vehicle (i.e. a car, truck, sports utility vehicle, or the like).

Generally, a disc brake assembly includes a caliper body, a rotor, and two brake pads. The caliper body is in communication with an inboard brake pad and an outboard brake pad that are on opposing sides of the rotor. The brake pads may be held in communication with a support bracket of the caliper body by a pad clip. A pad clip may be placed between each end of the brake pads and a support bracket. Preferably, when pad clips are used one pad clip is used at each end of the brake pads so that the brake pads are maintained in communication with the support bracket. The present invention may include a spreader spring at one end of the brake pads. Preferably, a spreader spring is located at each end of each of the brake pads (i.e., includes four spreader springs) and each spreader spring is used in conjunction with a pad clip so that the spreader spring will assist the brake pads in retracting after a brake apply.

The spreader spring may be used in conjunction with a pad clip. The pad clip may be attached to a support bracket of a brake system. Preferably, the pad clip may be connected to an abutment of a support bracket. The pad clip may have one or more legs. Preferably, the pad clip has at least two legs. The pad clip may include a leg on each end of a bridge portion that connects the legs. The bridge portion may extend over a gap, under a gap, or both. The rotor may pass through a gap in the pad clip; preferably a gap below the bridge. The legs of the pad clip may substantially conform to the shape of the support bracket so that the pad clip attaches to the support bracket. For example, the legs of the pad clip may have a portion that protrudes out (i.e. angled bracket) of the legs so that the pad clip is shaped substantially similar to the support bracket so that the pad clip may be attached to the abutment of the support bracket.

The angled bracket may be any size and shape so that the angled bracket connects the pad clip to the support bracket. The angled bracket may exert a force on the angled bracket so that the angled bracket forms a fixed connection with the support bracket. The angled bracket may exert a sufficient force so that the pad clip is retained on the abutment of the support bracket. The angled bracket may be generally "U" shaped, generally "C" shaped, have two sides that converge towards one another and form a gripping portion, or a combination thereof. The angled bracket may have three walls. The three walls may be two walls that converge towards each other and a forward wall that connects the two converging walls. The three walls may be an upper wall, a lower wall, and a forward wall that connects the upper wall and the lower wall together. The forward wall when connected to the abutment of the support bracket may be spaced apart from the abutment so that a gap is formed between the forward wall and the abutment. However, a space may be formed between the upper wall, the lower wall, or both where the spreader spring may extend into so that the spreader spring is connected in the brake system. For example, as the upper wall, the lower wall, or both diverge towards each other a portion may be located at a distance from the abutment forming a space and a portion of the spreader spring may extend into the space. The space between the pad clip and the support bracket may be sufficiently large so that at least a portion of the spreader spring may fit within the space. A spreader spring and preferably a locking arm may extend between the forward wall and the angled bracket.

The spreader spring may be connected to the angled bracket. The spreader spring may form a fixed connection with the angled bracket of the pad clip. The pad clip may be free of attachment to the spreader spring. For example, the pad clip does not have any additional pieces that grip, hold, guide, the like, or a combination thereof either temporarily or permanently the spreader spring. The pad clip may be free of a spring assembly support (e.g. a tubular support, lug, angled bracket, hook, locator, restraint, the like, or any combination thereof). The spreader spring may include one or more locking arms that form the fixed connection with the angled bracket.

The one or more locking arms may be any size and shape so that the locking arms form a fixed connection with the angled bracket, extend behind the angled bracket, connect with a portion of the pad clip, connect with a portion of the support bracket, or a combination thereof. The one or more locking arms may be configured so that the locking arms extend between the angled bracket and support bracket. The locking arms may be configured so that during a brake apply the force of the brake pads in the brake apply direction assists in maintaining the connection between the locking arms and a brake component, assists in maintaining the locking arm at a maximum depth between the pad clip and the abutment, or both. For example, during each brake apply the retraction arm may pull the locking arm to a maximum connection depth and the bias device may elastically deform and store energy during movement to the maximum depth, once the maximum depth is achieved, or both. The one or more locking arms may form a fixed connection with the angled bracket. Preferably, the one or more locking arms exert a force on the inside of the angled bracket and the force retains the one or more locking arms within the angled bracket. The force created by the one or more locking arms may be sufficiently large so that the locking arms retain the spreader spring in contact with the angled bracket. The one or more locking arms may include a portion that contacts each of the walls that converge towards each other (i.e., the upper wall and the lower wall). The one or more locking arms may be free of a connection with the front wall of the angled bracket. The one or more locking arms may grip a portion of the pad clip, extend outside of the angled bracket and form a connection with an outside of the angled bracket, partially extend outside of the angled bracket and partially inside of the angled bracket, form a connection with the forward wall, or a combination thereof. Each of the one or more locking arms may include a bias lock.

The bias lock may be any size and shape so that the bias lock assists the locking arm in creating a force within the angled bracket. The bias lock may create a force on the angled bracket. The bias lock may create a holding force and an opposing holding force within the angled bracket so that the locking arm connects the spreader spring to the angled bracket. For example, the bias lock may bias one side of the locking arm against the upper wall producing a holding force and another side of the locking arm against the lower wall producing an opposing holding force. The bias lock may be an angled portion that biases the locking arm and creates a holding force, an opposing holding force, or both. The bias lock may be an arcuate portion, a curve, a portion that connects two adjacent portions of the locking arm, or a combination thereof. The bias lock may act as a spring, a cantilever connection, or both. The bias lock may bias two adjacent portions of the locking arm so that the locking arms are moved into contact with the angled bracket so that the bias lock assists in connecting the spreader spring with the angled bracket. The bias lock may produce a sufficient force so that spreader spring is connected to the pad clip.

The bias lock may produce any force so that the spreader spring is retained within the brake system, in contact with the pad clip, in contact with the angled bracket, or a combination thereof during running, a brake apply, a brake retract, or a combination thereof. The bias lock may create a gripping force, a spreading force, or a combination of both. The force may be two opposing forces (i.e., a holding force, an opposing holding force) that connect the spreader spring to a brake component, to the pad clip, or preferably the angled bracket of the spreader spring. The holding force, the opposing holding force, or both may be about 5 N or more, about 10 N or more, or about 15 N or more. The holding force, the opposing holding force, or both may be about 50 N or less, about 40 N or less, about 30 N or less, or about 20 N or less. Preferably, the holding force may be applied to one part of the pad clip and the opposing holding force may be applied to a portion of the pad clip that is opposite the holding force. The holding force, the opposing holding force, or both may be created on any part of the pad clip, the support bracket, the abutment, the angled bracket, or a combination thereof so that the spreader spring is retained within the brake system. The locking arm may be connected to a bias device and assists in connecting the bias device within the brake system.

The bias device may be any device that assists in moving a retraction arm, storing energy, moving a brake pad, or a combination thereof. The bias device may store energy during a brake apply so that when the brake apply is complete the stored energy is released and the brake pads are retracted to a running position. The bias device may be any device that provides a sufficient amount of force that a brake pad is retracted when a brake pad is complete. The bias device may be any device that is elastically deformable and assists in retracting a brake pad after a brake apply. The bias device may orient the brake pads against the fingers, the piston, or both so that the brake pads are parallel to the rotor during running and/or during a brake apply. The bias device may pre-load the brake pads so that rattle is substantially reduced and/or eliminated during running. The bias device may be one or more groups of helical loops.

The one or more groups of helical loops may have any configuration so that the one or more groups of helical loops store energy during a brake apply and release the energy during a brake release so that the brake pads are retracted. Each group of helical loops may be successively stacked so that one loop is located directly above another loop. Preferably, when only one group of helical loops is present the group of helical loops are an extended group of helical loops. The extended group of helical loops may include an axis that extends through the group of helical loops (i.e., eight helical loops or more and preferably ten helical loops or more). The one or more groups of helical loops may be configured so that each group of helical loops has an axis that extends through the helical loops. The group of helical loops may be conical in shape; may be staggered so that the loops are not concentric, not coaxial, or both; may be substantially the same size but be staggered so that a common axis that runs through the center of all of the helical loops diagonally at an angle; or a combination thereof. For example, a group of concentric helical loops may be pushed over at an angle so that the axis is tilted at an angle. Preferably, each helical loop in each group of helical loops are concentric, coaxial, have the same diameter, have the same circumference, or a combination thereof. The one or more groups of helical loops may be two or more groups of helical loops. There may be two or more or more groups of helical loops and each of the two or more groups of helical loops has an axis, and the axis of the groups of helical loops may be parallel to each other, perpendicular to each other, at an angle relative to each other, aligned in the same direction, aligned in a different direction, or a combination thereof. For example, one group of helical loops may have an axis that is normal to a surface and an adjacent group of helical loops may be turned on a side so that the axis is parallel to the surface. Preferably, the one or more axes that extend through the one or more groups of helical loops may be parallel to both the retraction arm and the locking arm. Preferably, the two or more groups of helical loops each include an axis that extends through the group of helical loops and are substantially parallel. The one or more axes that extend through the group of helical loops may be normal, parallel, perpendicular, or a combination thereof to the locking arm, the retraction arm, or both. The two or more groups of helical loops may be looped in the same direction, in the opposite direction, in a clockwise direction, in a counter clockwise direction, be a right handed helical loop, a left handed helical loop, or a combination thereof. In one example, one group of helical loops may be wound clockwise and one group of helical loops may be wound counter clockwise. The two or more groups of helical loops may be connected together.

The two or more groups of helical loops may be connected together by one or more loop arms. The one or more loop arms may be any part of the spreader spring that connects two groups of helical loops together. The one or more loop arms may be any part of the spreader spring that allows the groups of spreader springs to move independently of each other, in unison, or a combination of both. The one or more loop arms may be configured so that during a brake apply one group of helical loops is moved in the braking direction and when a brake apply is complete the group of helical loops is moved in the retract direction. The one or more loop arms may extend from the top of one group of helical loops to the top of an adjacent group of helical loops, from the bottom of one group of helical loops to the bottom of an adjacent group of helical loops, from the bottom of one group of helical loops to the top of an adjacent group of helical loops, from the top of one group of helical loops to the bottom of an adjacent group of helical loops, or a combination thereof. Each of the one or more groups of helical loops may be comprised of one or more helical loops.

The one or more helical loops may be any configuration where a portion of the spreader spring generally curves back over itself. The one or more helical loops may be configured so that each of the helical loops stores energy during a brake apply and releases energy when the brake apply is over so that the energy is released and assists in retracting the brake pad. The one or more helical loops may be generally circular, generally oval, or both. The one or more groups of helical loops preferably have a total of about 6 loops or more, about 8 loops or more, about 10 loops or more, or even about 11 loops or more. Each of the helical loops during a brake apply may be moved so that the loops store energy.

The helical loops during a brake apply may move along the axis (i.e., the axis that runs through the center of the loops), may be compressed (i.e., a diameter of the loop may be decreased), may be expanded (i.e., a diameter of the loop may be increased), may be moved at an angle relative to the axis, or a combination thereof. The helical loops during a brake apply may be axially moved relative to each other so that one side of a group of helical loops is compressed (i.e., moved closer to each other) and one side of the group of helical loops is moved into tension (i.e., moved farther apart from each other so that gaps are formed between the helical loops), however, both sides may be compressed, put in tension, or both along the axis of the group of helical loops. The group of helical loops, during a brake apply, may be axially stretched so that a full circumference of one or more of the helical loops within the group of helical loops are moved away from an adjacent helical loop, axially compressed so that a full circumference of one or more of the helical loops within the group of helical loops are moved towards an adjacent helical loop, or both. The group of helical loops, during a brake apply, may be compressed so that the size (e.g., diameter) of the one or more helical loops is reduced. The group of helical loops, during a brake apply, may be expanded so that the size (e.g., diameter) of the one or more helical loops is increased. The one or more helical loops may be moved in a brake apply direction, a brake release direction, or both. The entire group of helical loops, a part of the group of helical loops, or both may be moved in the brake apply direction, the brake retract direction, or both. When two or more groups of helical loops are present the groups of helical loops may move relative to each other. The group of helical loops may be free of movement in the brake apply direction, the brake retract direction, or both. The one or more helical loops may be moved in a spring compression direction, a spring release direction, or both. The bias device may include an angled portion that extends between and connects the bias device to a retraction arm.

The angled portion may be any portion of the spreader spring that connects the bias device with an adjacent component. The angled portion may be rigid, flexible, straight, arcuate, have an undulating shape, include two straight segments that are connected by an angle, or a combination thereof. The spreader spring may be free of an angled portion and the bias device may directly connect to the retraction arm. The angled portion may be a step that moves the bias device and the retraction arm into the same plane, into two separate planes, into parallel planes, into two intersecting planes, or a combination thereof. The angled portion may be configured so that the locking arm extends substantially parallel to the front wall of the pad clip and the bias device extends at an angle relative to the front wall, the locking arm, or both. Preferably, the angled portion angles the bias device so that at least a portion of the bias device extends in front of a plane of the front wall. The angled portion may be configured so that the bias member and retraction arm are at an angle relative to each other. The retraction arm and bias member may be separated by an angle of about 85 degrees or more, about 90 degrees or more, about 95 degrees or more, about 100 degrees or more, about 105 degrees or more, or even about 115 degrees or more. The retraction arm and bias member may be separated by an angle of about 145 degrees or less, about 135 degrees or less, or about 125 degrees or less. The angled portion may be at an angle so that the retraction arm is generally planar with a front wall of the pad clip.

The retraction arm may be any arm that assists in forming a connection with one or more brake pads, retracting one or more brake pads, or both. The retraction arm may be any size and shape so that the retraction arm extends between a brake pad and the bias device so that during a brake apply energy from movement of the brake pad may be transferred to the bias device and after a brake apply the energy may be transferred back to the brake pad so that the brake pad is retracted. The retraction arm may extend so that a portion of the retraction, arm extends over the brake pad, under the brake pad, over an ear of the brake pad, under an ear of the brake pad, into contact with a bore in the pressure plate of the brake pad, to the side of the pressure plate proximate to the friction material, or a combination thereof. Preferably, the retraction arm extends along a brake pad side of the pad clip and into contact with a brake pad. More preferably, the retraction arm extends along a brake pad side of the forward wall of the angled bracket and to the friction material side of the pressure plate. The retraction arm may be sufficiently long so that the retraction arm extends from the bias device to the brake pad. The length of the retraction arm may be selected so that the retraction arm has a sufficient mechanical advantage to retract the brake pads but not so large so that the retraction arm is bent or damaged during a brake apply, a brake release, running, or a combination thereof. The retraction arm may be longer then the bias device, longer than the locking arm, or both. The retraction arm may run along all or a portion of the bias device, all or a portion of the locking arm, or both. The bias device plus the locking arm may have a length (X) and the retraction arm may have a length (Y). The length X may be about Y or more, about 1.1Y or more, about 1.2Y or more, about 1.3Y or more, preferably about 1.4Y or more (i.e., about 1.45Y). The length X may be about Y or less, about 0.95Y or less, about 0.9Y or less, about 0.8Y or less, or about 0.85Y or less. The retraction arm may include a connection arm.

The connection arm may be any arm that forms a connection between the spreader spring and the brake pad so that the spreader spring assists in retracting a brake pad. The connection arm may be any device that may contact a portion of the brake pad, the pressure plate of the brake pad, a bore in the brake pad, or a combination thereof. The connection arm may form a fixed connection with an ear of the brake pad. The connection arm may grip a portion of the brake pad, may grip the pressure plate, may wrap around the brake pad, may wrap around the pressure plate, may extend to the friction side of the pressure plate, or a combination thereof. The connection arm may extend from the retraction arm at an angle. The connection arm and retraction arm may form an angle of about 120 degrees or less, about 105 degrees or less, or about 95 degrees or less. The connection arm and retraction arm may form an angle of about 60 degrees or more, about 75 degrees or more, or about 85 degrees or more. The connection arm may be a single arm, may include one or more portions, two or more portion, a biasing member, or a combination thereof.

The spreader spring may deform as the brake pads wear. The deformation may be elastic deformation. For example, the shape of the spreader spring does not permanently change as the brake pads wear, but the spreader spring elastically deforms so that the spreader spring remains in contact with the brake pad as the friction material wears, and assists in returning the brake pad substantially back to their pre-brake position so that a constant air gap is maintained. Air gap may be the total distance between the face of the inboard brake pad and the face of the outboard brake pad minus the thickness of the rotor, when the inboard brake pad contacts the piston and the outboard brake pad contacts the fingers. To state it another way, air gap may be the distance between the face of the rotor on the outboard side and the face of the outboard brake pad when the inboard brake pad is pushed into contact with the face of the rotor on the inboard side and when the inboard brake pad contacts the piston and the outboard brake pad contacts the fingers. The air gap may be any size that allows for braking. The air gap may be of any size that does not cause the brake pedal to have a soft feel or a long travel. Preferably, the air gap will be small (e.g. between about 0.05 mm to about 0.2 mm). Preferably, the deformation may be plastic deformation. For example, as the brake pads wear the spreader spring will change shape so that as the friction material wears the retraction of the brake pad is less but the air gap is maintained at substantially the same distance. In another example, as the spreader spring plastically deforms the force exerted against each brake pad will remain substantially constant.

The spreader spring may exert a force axially, in relationship to the rotor, in the retract direction. The spreader spring may apply any amount of force that assists the brake pads in moving axially, relative to the rotor, after a brake apply. Preferably, each of the spreader springs may exert substantially the same force on each of the respective brake pads. The one or more spreader springs may each exert an axial force in the retract direction of about 5 N or more, about 10 N or more, about 15 N or more, about 20 N or more, about 25 N or more, or even about 30 N or more. The one or more spreader springs may each exert an axial force in the retract direction of about 50 N or less, about 45 N or less, about 40 N or less, or even about 35 N or less. Preferably, four spreader springs are used (i.e. one on each side of each the brake pads). More preferably, each spreader springs may exert an axial force in the retract direction; for example, one spreader spring may exert a force of about 20 N and two spreader springs may exert a force of about 40 N on each brake pad. Two spreader springs may exert a force of about 10 N or more, about 20 N or more, about 30 N or more, about 40 N or more, about 50 N or more, or even about 60 N or more. Two spreader springs may exert a force of about 100 N or less, about 90 N or less, about 80 N or less, or about 70 N or less. Preferably, the brake may include an inboard brake pad and an outboard brake pad and the one or more spreader spring will apply substantially the same amount of force to both brake pads in the retract direction.

The spreader spring may be made of any material that may be formed and may exert a force when compressed. The spreader spring may be made of and/or include polymeric materials. The spreader spring may be made of and/or include multiple materials. For example, a portion of the spring may be metal and another portion may be a polymeric material such as rubber. Preferably, the spring may be made of metal. The spring may be any metal that exhibits good plastic deformation and good elastic deformation characteristics. More preferably, the spring may be made of stainless steel. The spreader spring may be made of a wire, a sheet, a band, tube, pipe, or the like. Preferably, the spring is made of wire. The material may be any gauge that assists in moving the brake pads in the retract direction. The material may be any size that allows the spreader spring to exert a desired force. The material may be any size (e.g. thickness, diameter, gauge, length, width, or the like) that allows the spreader spring to assist in pad retraction. The wire may be about 0 gauge or larger, about 3 gauge or larger, about 5 gauge or larger, or about 10 gauge or larger. The wire may be about 30 gauge or smaller, about 25 gauge or smaller, or about 20 gauge or smaller (e.g., between about 22 gauge and about 12 gauge (i.e., about 18 gauge when measured using the steel wire gauge scale)).

FIG. 1 illustrates a brake system 2 including a caliper 4 and a support bracket 6. A pad clip 30 is connected to an abutment 40 of the support bracket 6 and a spreader spring 50 is connected to the pad clip 30.

Figure 2:
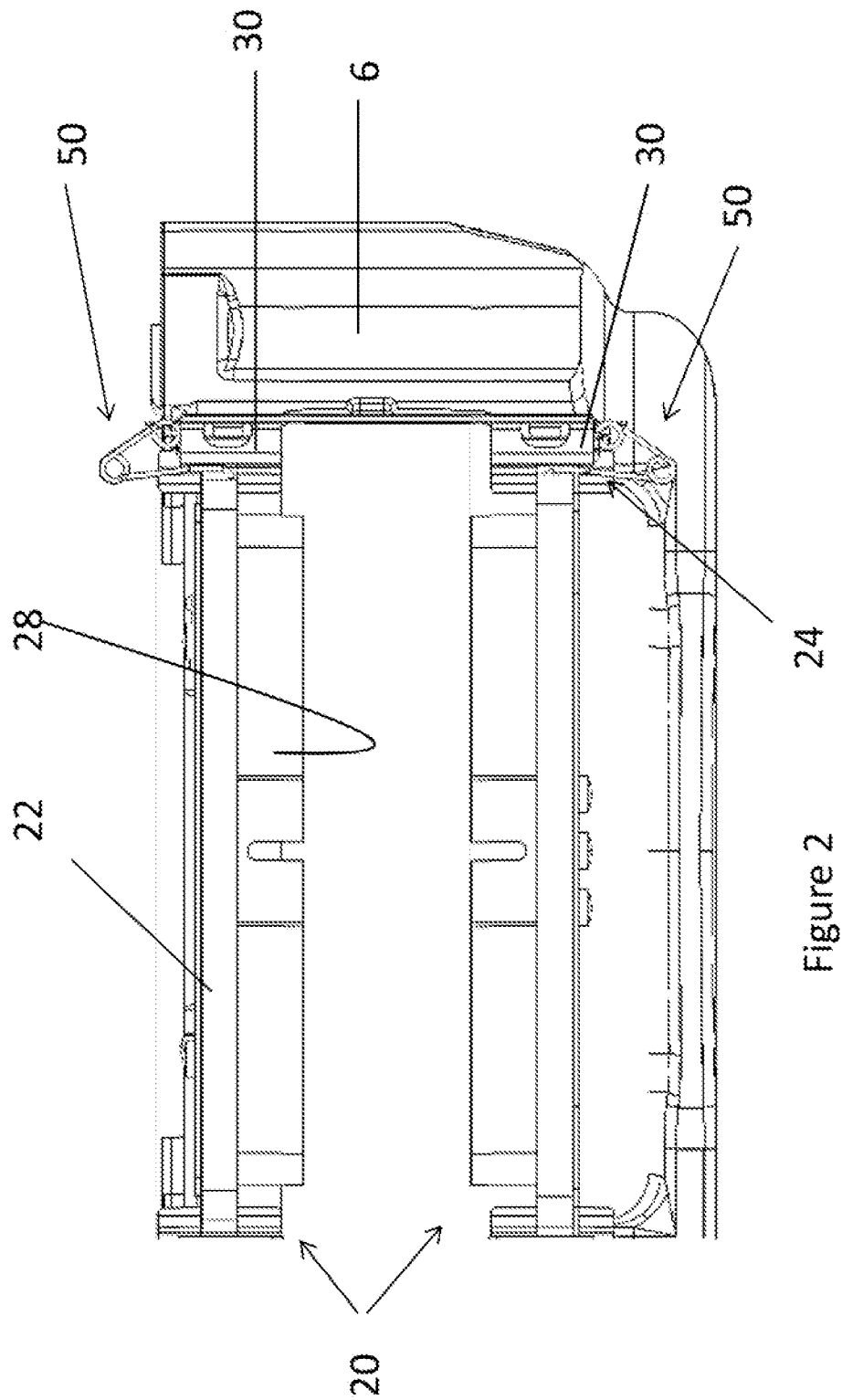
FIG. 2 illustrates a top view of a support bracket including a pad clip and brake pads with spreader springs.

FIG. 2 illustrates a top view of a support bracket 6 including a pair of brake pads 20. The brake pads 20 include a pressure plate 22 and friction material 28 so that when the friction material is moved into contact with a rotor (not shown) a brake force is created. The pressure plates 22 each includes an ear 24 that extends into contact with a pad clip 30 connected to the support bracket 6. A spreader, spring 50 is connected to each side of the pad clip 30. A spreader spring 50 is in contact with each ear 24 of a respective brake pad 20 so that after a brake apply the spreader spring 50 assists in retracting the brake pad 20.

Figure 3:
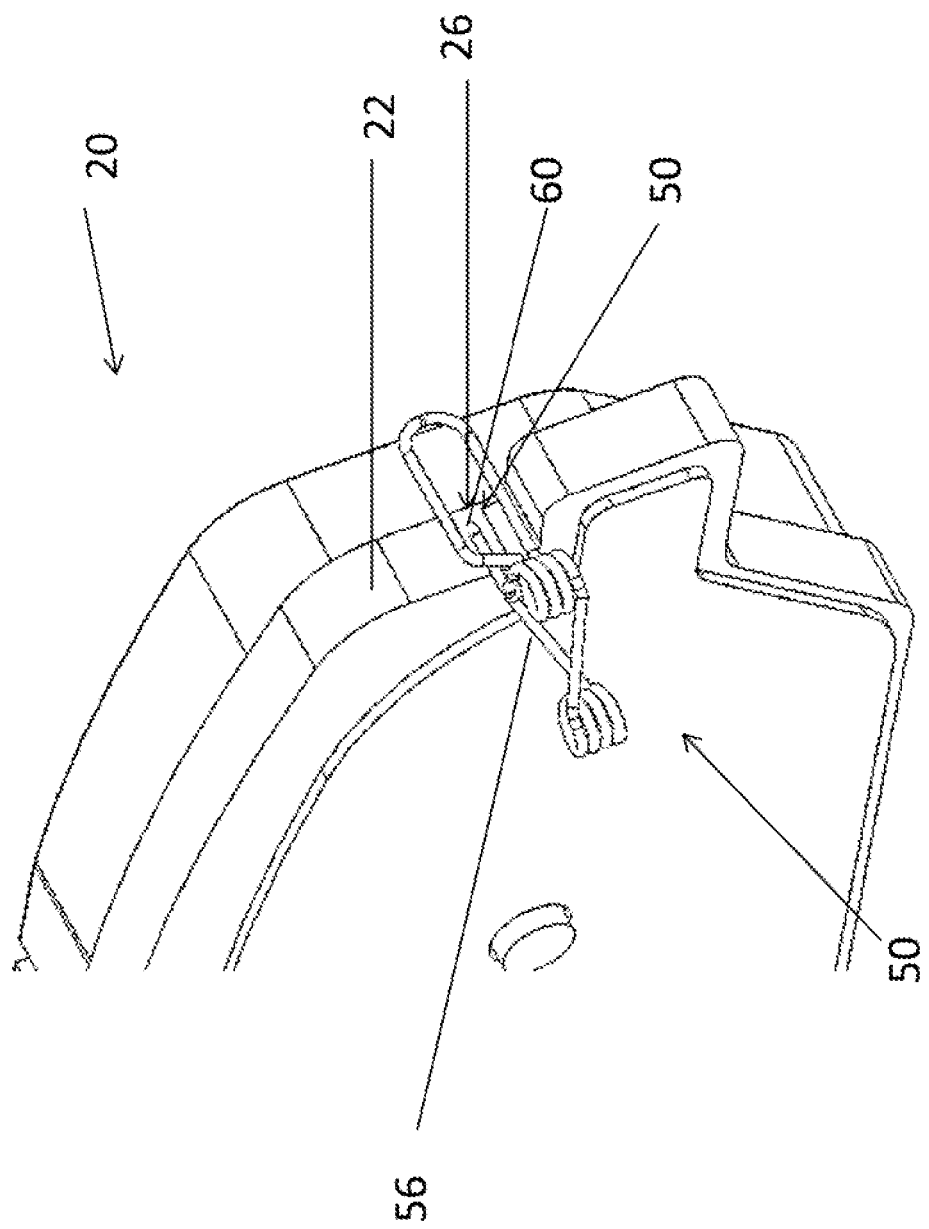
FIG. 3 illustrates one possible connection between a spreader spring and a brake pad.

FIG. 3 illustrates one possible attachment between the spreader spring 50 and the brake pad 20. A connection arm 60 on the end of a retraction arm 56 of the spreader spring 50 extends into a bore 26 in the pressure plate 22 so that a connection between the brake pad 20 and the spreader spring 50 is formed.

Figure 4:
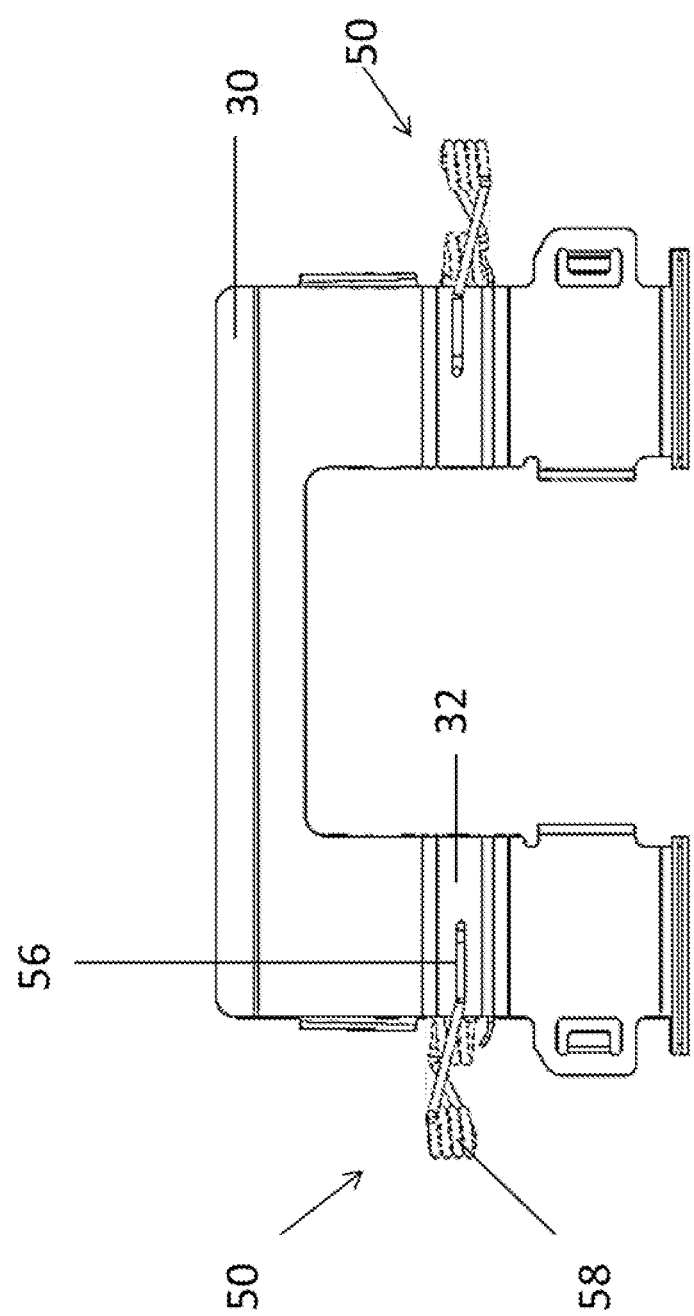
FIG. 4 illustrates a front view of a pad clip including two spreader springs.

FIG. 4 illustrates a front view of a pair of spreader springs 50 connected to a pad clip 30. Each of the spreader springs 50 have a locking arm 52 (not shown) that extends behind an angled bracket 32 of the pad clip and a retraction arm 56 that extends in front of the angled bracket 32 for retracting a brake pad. The retraction arm 56 is connected to a bias device 58 that moves the retraction arm along the angled bracket 32.

Figure 5:
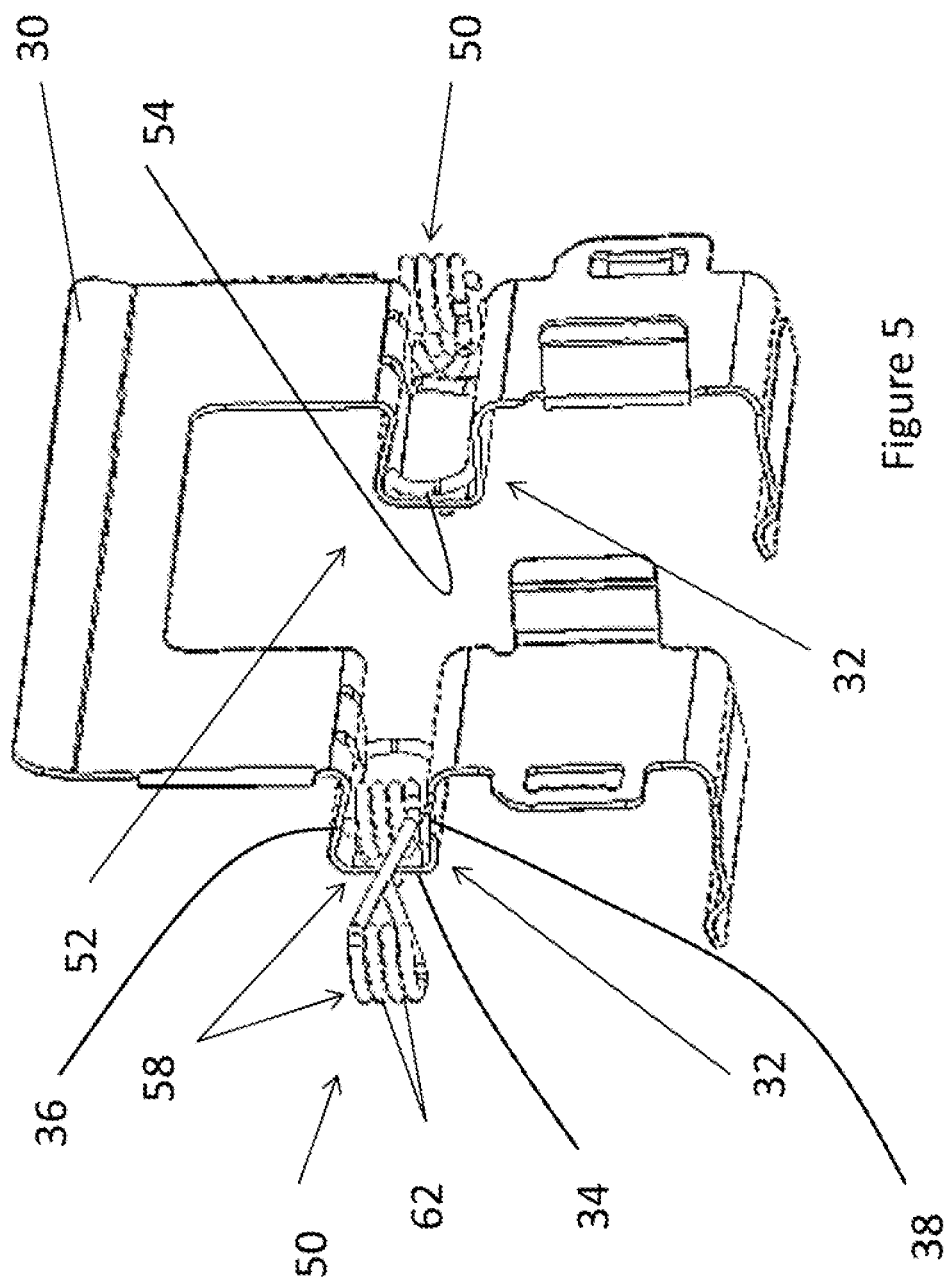
FIG. 5 illustrates a rear perspective view of the pad clip and spreader springs of FIG. 4.

FIG. 5 illustrates a perspective view of the rear side of the pad clip 30 of FIG. 4. The pad clip 30 includes a pair of angled brackets 32 each connected to a spreader spring 50. The angled brackets 32 include an upper wall 36 and a lower wall 38 that are connected by a forward wall 34. As illustrated the upper wall 36 and lower wall 38 generally diverge towards each other so that the angled brackets 32 connects to a abutment (not shown) of the support bracket (not shown). A locking arm 52 of the spreader spring 50 extends behind the angled bracket 32 and includes a bias lock 54 for creating a force within the angled bracket 32 so that the spreader spring is connected to the pad clip 30. The spreader spring 50 includes two bias devices 58 that assist in creating a retraction force after a brake apply. As illustrated the bias devices 58 includes a plurality of helical loops 62.

Figure 6:
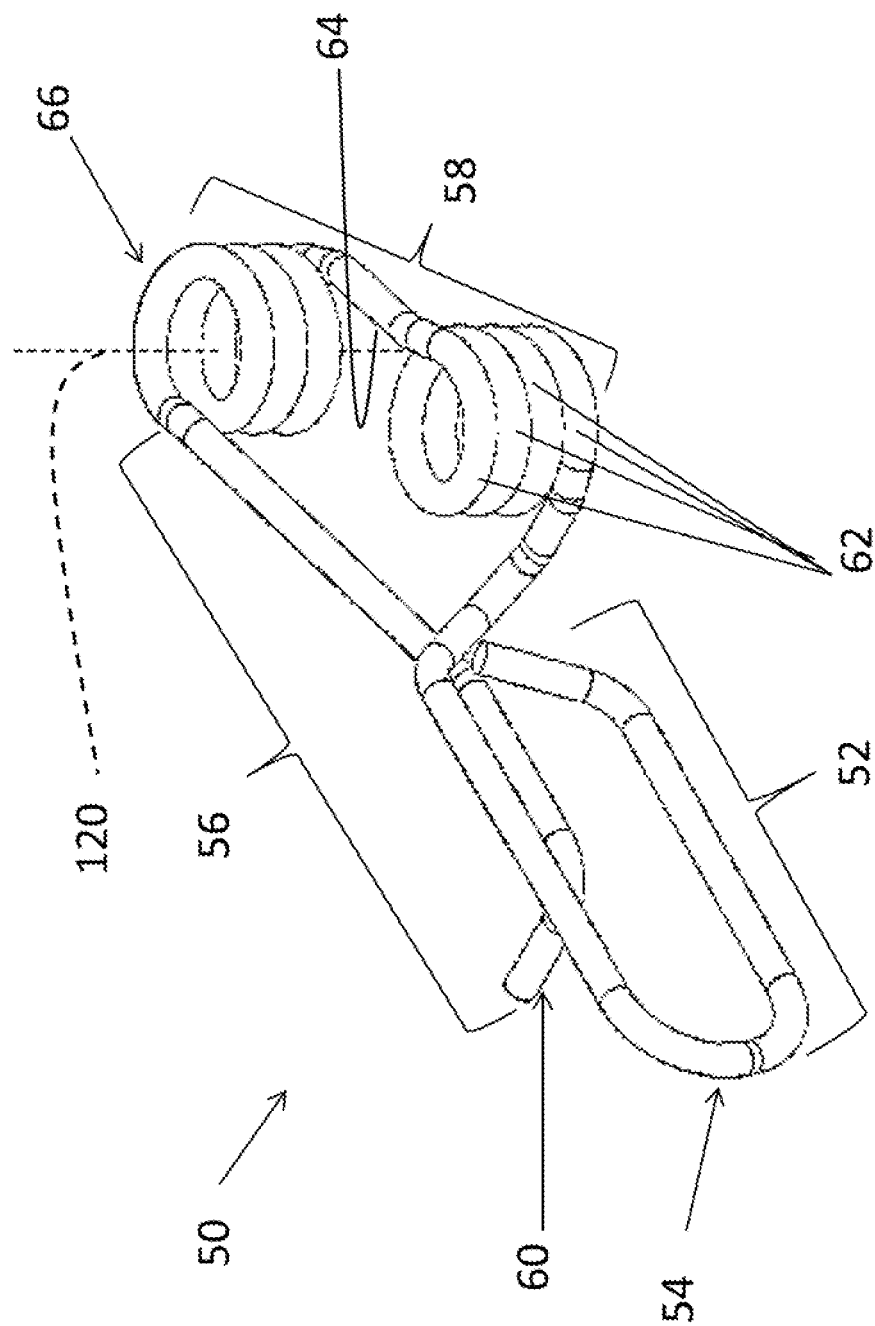
FIG. 6 illustrates a perspective view of a spreader spring of the teachings herein.

FIG. 6 illustrates a spreader spring 50 in a retracted state (i.e., during running). The spreader spring 50 includes a locking arm 52 having a bias lock 54 that allows the locking arm 52 to move and assists in forming a secured connection with a pad clip 30 (not shown). A bias devices 58 is located between the locking arm 52 and the retraction arm 56. The bias devices 58, as illustrated, is comprised two groups of helical loops 66 connected by a loop arm 64. The two groups of helical loops 66 each including four helical loops 62 that store energy and allow the retraction arm 56 to move with the brake pads (not shown) during a brake apply without fully plastically deforming (i.e., deforming so that the retraction arm remains in the braking state). An axis 120 is illustrated extending through a group of helical loops 66 and the axis is aligned generally parallel a plane of the locking arm 52 and a plane of the retraction arm 56. A distal end of the retraction arm 56 includes a connection arm 60 that extends around a part of the pressure plate, into a bore in the pressure plate, or a combination of both.

FIGS. 7A and 7B illustrate the position and configuration of the spreader spring 50 during a brake apply and subsequent a brake retract in a running position. FIG. 7A illustrates the spreader spring 50 in a position during a brake apply where a brake pad (not shown) contacts a connection arm 60 moving the retraction arm 56 in the braking direction 80 so that one of the group of helical loops 66 is moved in the spring compression direction 82 so that both groups of helical loops are compressed and energy is stored in the bias device 58. The two groups of helical loops 66 are connected by a loop arm 64. The bias device 58 is connected to a locking arm 52 that connects the spreader spring 50 to a pad clip (not shown).

FIG. 7B illustrates the spreader spring 50 in a running position. Once a brake apply is complete the retraction arm 56 is pulled in the retraction direction 84 moving the connection arm 60 so that a brake pad (not shown) is moved away from a rotor (not shown). The energy stored in the bias device 58 in the groups of helical loops 66 moves at least one of the groups of helical loops 66 in the spring release direction 86. The two groups of helical loops 66 are connected together by a loop arm 64 so that the energy of the bias device 58 is distributed between the two groups of helical loops. The bias device 58 is connected to a locking arm 52.

Figure 8:
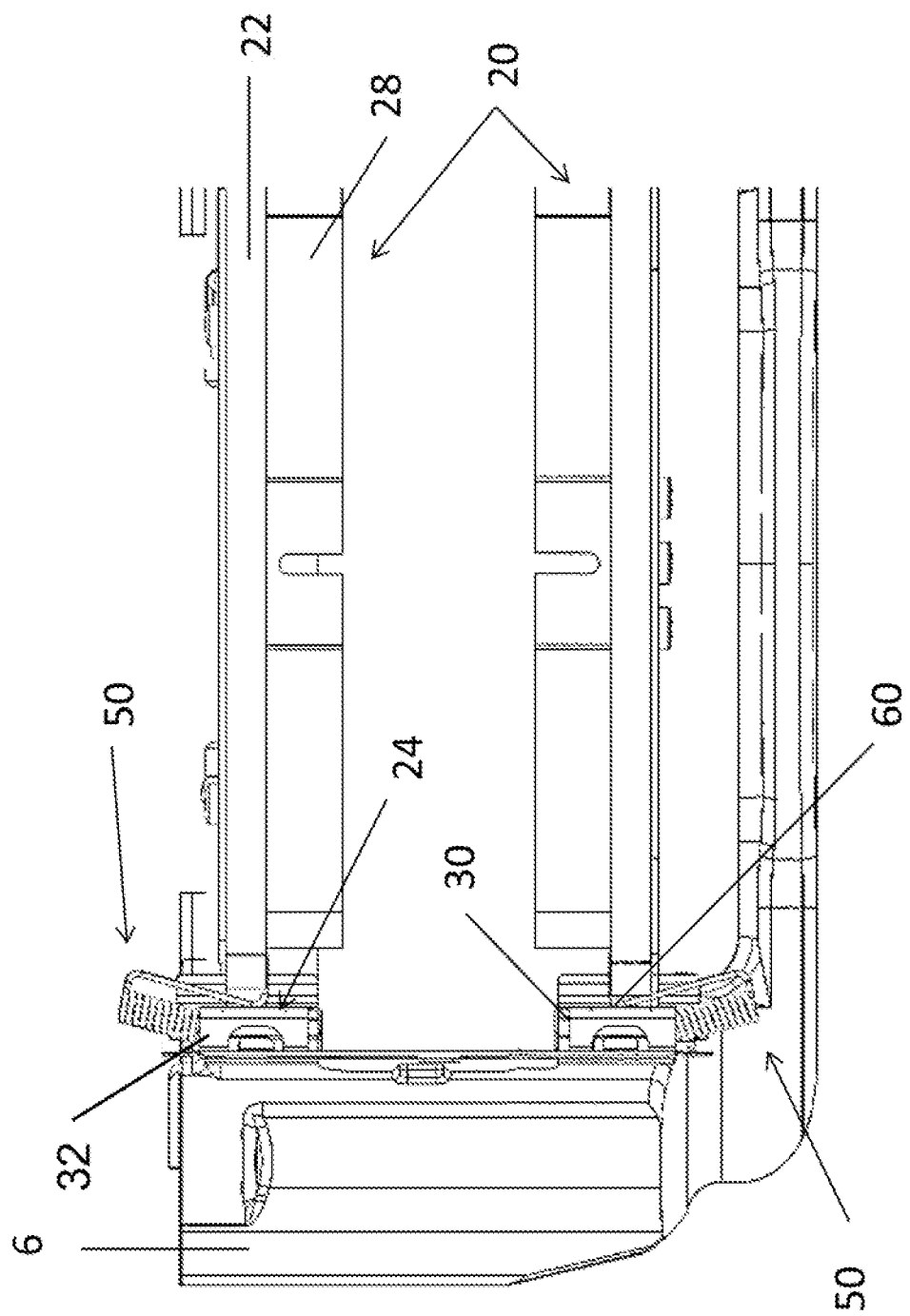
FIG. 8 illustrates a top view of one possible spreader spring installed in a support bracket including a pad clip and brake pads.

FIG. 8 illustrates a top view of a support bracket 6 including a pair of brake pads 20. The brake pads 20 include a pressure plate 22 and friction material 28 so that when the friction material 28 is moved into contact with a rotor (not shown) a brake force is created. The pressure plates 22 each includes an ear 24 that extends into contact with a pad clip 30 connected to the support bracket 6. As illustrated the ear 24 extends under the angled bracket 32 of the pad clip 30. A spreader spring 50 is connected to each side of the pad clip 30. The spreader spring 50 is in contact with the ear 24 of a respective brake pad 20 via a connection arm 60 so that after a brake apply the spreader spring 50 assists in retracting the brake pad 20.

Figure 9:
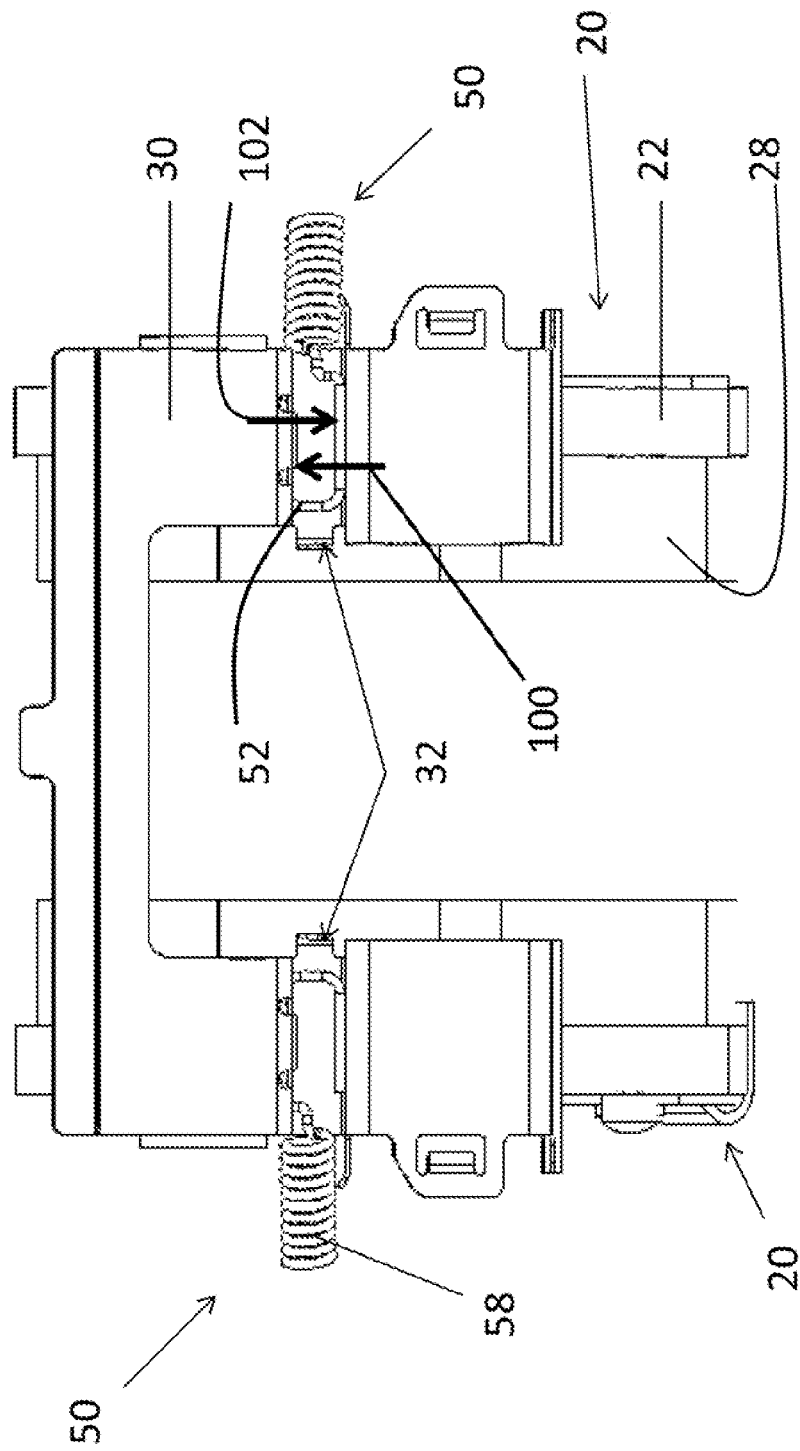
FIG. 9 illustrates a rear view of FIG. 8 with the support bracket removed.

FIG. 9 illustrates a rear view of FIG. 7 with the support bracket removed. As illustrated the spreader springs 50 are connected to each side of the pad clip 30 via an angled bracket 32 and extend out from the pad clip 30. The brake pads 20 are connected to the pad clip 30 so that the pressure plate 22 is in contact with at least a portion of the pad clip 30 and the friction material 28 extends beyond the pad clip 30 with a gap therebetween for a rotor (not shown) to rotate through during running. As illustrated, the locking arm 52 creates a holding force 100 on one side of an abutment 32 of a pad clip 30 and an opposing holding force 102 on a second side of the abutment 32 of the pad clip 30 so that the spreader spring 50 is retained in place. The bias device 58 extends beyond the pad clip 30 so that the retraction arm (not shown) contacts the brake pad 20.

Figure 10:
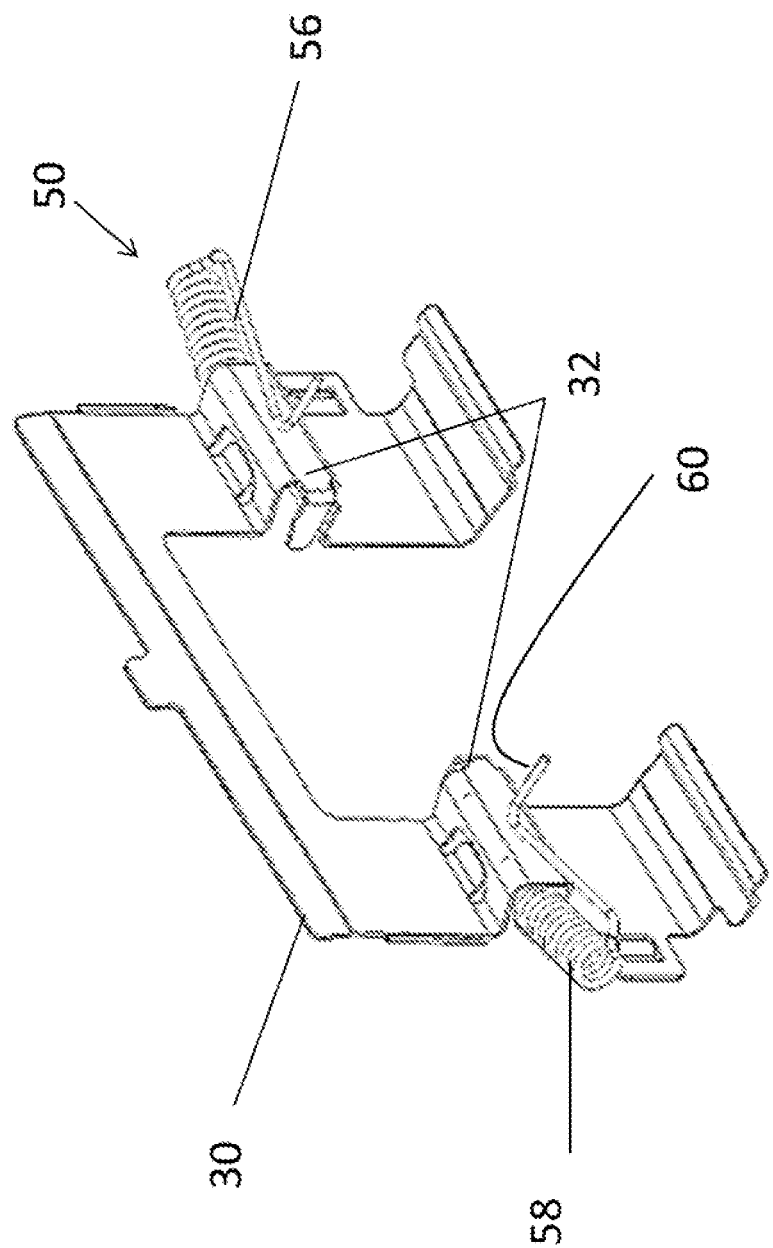
FIG. 10 illustrates a front perspective view of a pad clip including a pair of spreader springs of the teachings herein.

FIG. 10 is a front perspective view of a pad clip 30 including a spreader spring 50 extending from each side. As illustrated, the spreader springs 50 include a bias device 58, a retraction arm 56, and a connection arm 60. The connection arm 60 extends in front of the angled bracket 32 so that the connection arm 60 forms a connection with a brake pad (not shown) and assists in retracting the brake pad (not shown).

Figure 11:
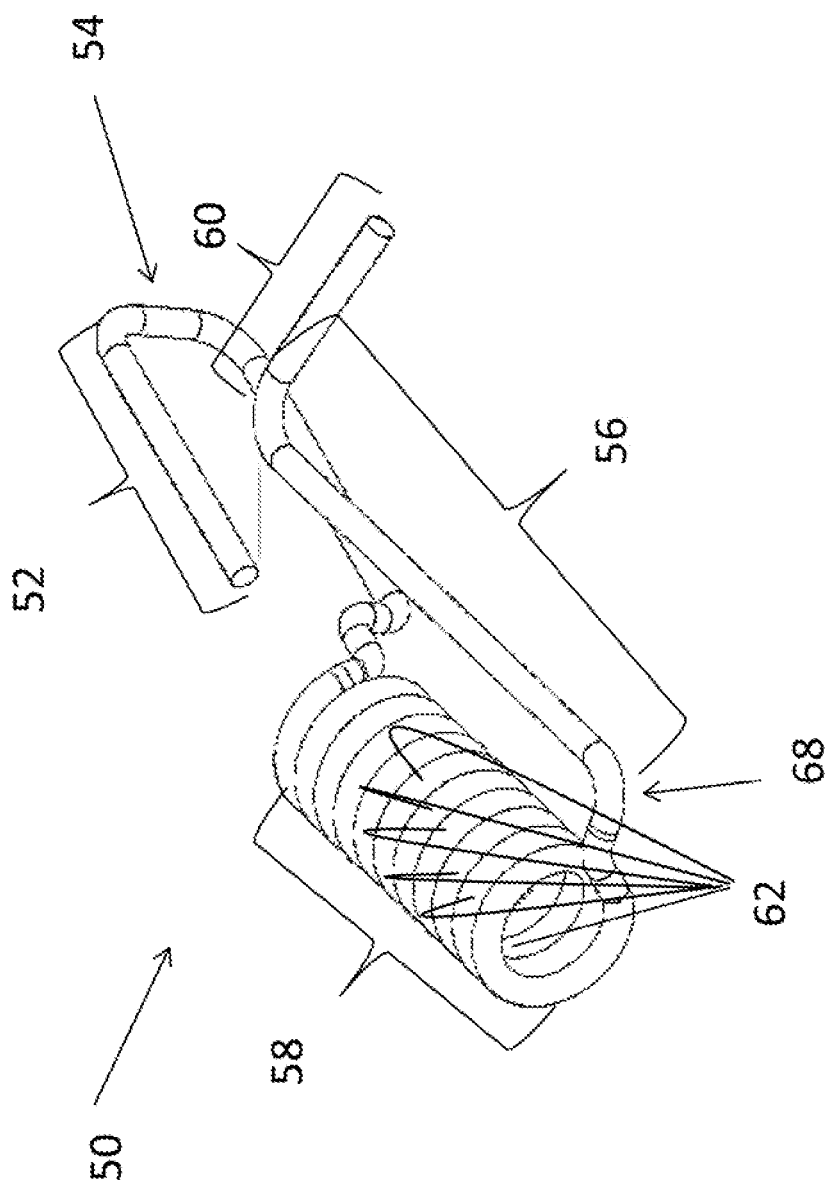
FIG. 11 illustrates a perspective view of a spreader spring of the teachings herein.

FIG. 11 illustrates an example of a spreader spring 50 of the teachings herein. The spreader spring 50 includes a locking arm 52 with a bias lock 54 for forming a bias force so that the spreader spring 50 is connected within a brake system. The locking arm 52 is connected to a bias device 58 and the opposing side of the bias device 58 is connected to the retraction arm 56. The locking arm 52 extends along a locking plane and the bias device 58 extends along a bias plane. The bias device 58 is constructed of a plurality of helical loops 62 that store energy during a brake apply so that the bias device 58 assists in moving a brake pad (not shown) to a running position after a brake apply. As illustrated the spreader spring 50 includes eleven helical loops 62. The retraction arm 56 is connected to the bias device 58 by an angled portion 56. The retraction arm 56 includes a connection arm 60 that forms a connection with a brake pad (not shown) so that the retraction arm 56 and connection arm 60 can be retracted by the bias device 58 after a brake apply. As illustrated, the spreader spring 50 is in the fully retracted state.

FIGS. 12A and 12B illustrate the position and configuration of the spreader spring 50 during a brake apply and subsequent brake retract to a running position. FIG. 12A illustrates a retraction arm 56 when a brake pad (not shown) moves the connection arm 60 in the braking direction 80. As the connection arm 60 moves in the braking direction 80 the bias device 58 is moved so that one side of the bias device 58 is placed in compression 90 so that the individual loops 62 are pushed together and one side is placed in tension 92 so that the individual helical loops 62 are spread apart. As the retraction arm 56 is moved in the braking direction 80 the angle between the locking arm 52 and the bias device 58 changes from ($\beta$) to ($\beta'$).

FIG. 12B illustrates the spreader spring 50 in the running position with the retraction arm 56 moving the connection arm 60 in the spring retraction direction 84. In the running position an angle (β) is formed between the locking arm 52 and the bias device 58.

Figure 13:
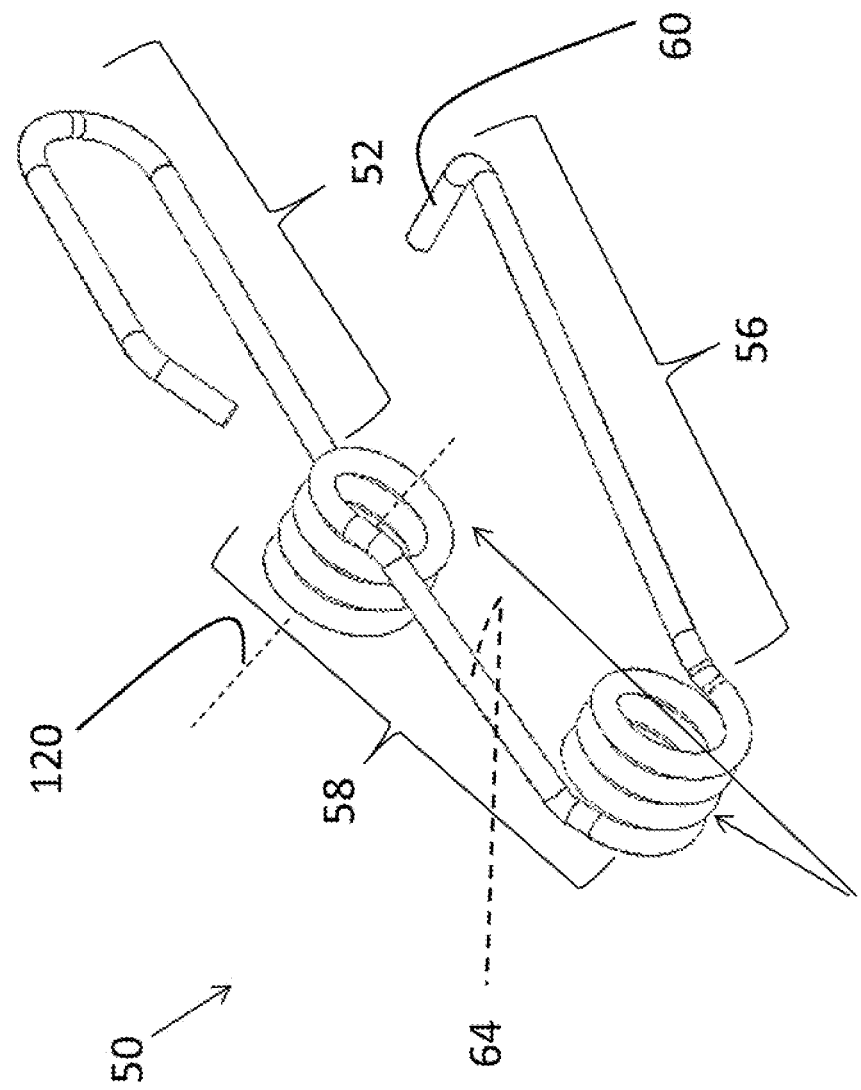
FIG. 13 illustrates a perspective view of one possible spreader spring of the teachings herein.

FIG. 13 illustrates a spreader spring 50 including a locking arm 52 connected to a bias device 58, and a retraction arm 56 connected to the bias device. As illustrated the bias device 58 includes two groups of helical loops 66 that are connected by a loop arm 64 and the groups of helical loops 66 are configured so that an axis 120 that extends through the group of helical loops 66 is substantially perpendicular (i.e., ±10 degrees and preferably ±5 degrees) to both the locking arm 52 and the retraction arm 56. The retraction arm 56 includes a connection arm 60 for connecting the spreader spring 2 to a brake pad (not shown). As illustrated, the groups of helical loops 66 of FIG. 13 are rotated 90 degrees when compared to the groups of helical loops of FIG. 6.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

We claim:

1. A spreader spring comprising:
   a. a locking arm that connects the spreader spring to a brake component;
   b. a retraction arm; and
   c. a bias device located between the locking arm and the retraction arm;
   wherein the bias device includes six helical loops or more that store energy during a brake apply and once the brake apply is complete assist in retracting a brake pad; and
   wherein the bias device includes two groups of helical loops and the six helical loops or more are distributed between the two groups of helical loops
   wherein a loop arm extends from a top of a group of one of the helical loops to a bottom of an adjacent group of helical loops.

2. The spreader spring of claim 1, wherein the locking arm includes one or more bias locks for biasing the locking arm so that the bias lock assists in connecting the locking arm to the brake component.

3. The spreader spring of claim 1, wherein the brake component is a pad clip.

4. The spreader spring of claim 1, wherein the two groups of helical loops each include the same number of helical loops.

5. The spreader spring of claim 1, wherein the two groups of helical loops include a different number of helical loops.

6. The spreader spring of claim 1, wherein the two groups of helical loops are connected by the loop arm.

7. The spreader spring of claim 1, wherein each of the two groups of helical loops each include four helical loops or more.

8. The spreader spring of claim 1, wherein the retraction arm includes an angled portion that connects the retraction arm to the bias device and is angled so that the retraction arm extends towards the locking arm.

9. The spreader spring of claim 1, wherein each of the two groups of helical loops each include an axis and each of the axes are oriented so that each of the axes extends substantially perpendicular to the retraction arm, the locking arm, or both.

10. The spreader spring of claim 1, wherein each of the two groups of helical loops each include an axis and each of the axes are oriented so that each of the axes are normal to a direction of retraction.

11. The spreader spring of claim 1, wherein the six helical loops or more are eight helical loops or more that are divided into two groups of helical loops and are connected by the loop arm so that the two groups of helical loops are capable of being moved independently of one another.

12. The spreader spring of claim 1, wherein the two groups of helical loops that are connected by the loop arm so that the two groups of helical loops are capable of being moved independently of one another.

13. A spreader spring comprising:
   a. a locking arm that connects the spreader spring to a brake component;
   b. a retraction arm; and
   c. a bias device located between the locking arm and the retraction arm;
   wherein the bias device includes eight helical loops or more that store energy during a brake apply and once the brake apply is complete assist in retracting a brake pad;
   wherein the bias device is one group of the eight helical loops or more;
   wherein the group of helical loops during a brake apply is moveable in a direction so that a first side of the group of helical loops is compressed and a second side of the group of helical groups is placed in tension.

14. The spreader spring of claim 13, wherein the bias device extends along a bias device plane, and the locking arm extends along a locking arm plane, and the bias device plane and the locking arm plane extend at an angle of about 75 degrees or more.

15. The spreader spring of claim 13, wherein the brake component is a pad clip and the locking arm includes one or more bias locks for biasing the locking arm so that the bias lock assists in connecting the locking arm to the brake component.

16. The spreader spring of claim 13, wherein the brake component is a pad clip and the bias device extends along a bias device plane, and the locking arm extends along a locking arm plane, and the bias device plane and the locking arm plane extend at an angle of about 75 degrees or more.

17. The spreader spring of claim 13, wherein the brake component is a pad clip and the retraction arm includes an angled portion that connects the retraction arm to the bias device and is angled so that the retraction arm extends towards the locking arm.

18. A spreader spring comprising:
   a. a locking arm that connects the spreader spring to a brake component;
   b. a retraction arm; and
   c. a bias device located between the locking arm and the retraction arm;
   wherein the bias device includes eight helical loops or more that store energy during a brake apply and once the brake apply is complete, assist in retracting a brake pad;
   wherein the bias device is one group of helical loops;
   wherein the group of helical loops during a brake apply is moveable in a direction so that a first side of the group of helical loops is compressed and a second side of the group of helical groups is placed in tension;
   wherein an axis extend through a center of the group of helical loops and the first side and the second side are on opposite sides of the axis.

19. The spreader spring of claim 18, wherein the brake component is a pad clip and the locking arm includes one or more bias locks for biasing the locking arm so that the bias lock assists in connecting the locking arm to the brake component.

20. The spreader spring of claim 18, wherein the brake component is a pad clip and the bias device extends along a bias device plane, and the locking arm extends along a locking arm plane, and the bias device plane and the locking arm plane extend at an angle of about 75 degrees or more.

21. The spreader spring of claim 18, wherein the brake component is a pad clip and the retraction arm includes an angled portion that connects the retraction arm to the bias device and is angled so that the retraction arm extends towards the locking arm.

22. A spreader spring comprising:
   a. a locking arm that connects the spreader spring to a pad clip,
      wherein the locking arm includes a bias lock so that the locking arm biases to form a connection with an abutment of the pad clip;
   b. a retraction arm having a connection arm extending therefrom,
      wherein the connection arm forms a connection with a brake pad; and
   c. a bias device located between the locking arm and the retraction arm;
   wherein the bias device includes eight helical loops or more that store energy during a brake apply and once the brake apply is complete assist in retracting a brake pad
   wherein the eight helical loops or more are one extended group of helical loops and the extended group of helical loops are concentric circles and during a brake apply one side of the extended group of helical loops is compressed and the other side is in tension so that energy is stored in the bias device.

23. The spreader spring of claim 22 wherein the bias device extends along a bias device plane, and the locking arm extends along a locking arm plane, and the bias device plane and the locking arm plane extend at an angle of about 75 degrees or more.

24. The spreader spring of claim 22, wherein the retraction arm includes an angled portion that connects the retraction arm to the bias device and is angled so that the retraction arm extends towards the locking arm.

25. A spreader spring comprising:
   d. a locking arm that connects the spreader spring to a pad clip,
      wherein the locking arm includes a bias lock so that the locking arm biases to form a connection with an abutment of the pad clip;
   e. a retraction arm having a connection arm extending therefrom,
      wherein the connection arm forms a connection with a brake pad; and
   f. a bias device located between the locking arm and the retraction arm;
   wherein the bias device includes eight helical loops or more that store energy during a brake apply and once the brake apply is complete assist in retracting a brake pad
   wherein the eight helical loops or more are divided into two groups of helical loops that are connected by a loop arm so that the two groups of helical loops are capable of being moved independently of one another
   wherein each of the two groups of helical loops each include four helical loops or more;
   wherein each of the two groups of helical loops each include an axis and each of the axes are oriented so that each of the axes extends substantially perpendicular to the retraction arm, the locking arm, or both; and
   wherein the loop arm extends from a top of one group of helical loops to a bottom of a second group of helical loops.

26. The spreader spring of claim 25, wherein the bias device extends along a bias device plane, and the locking arm extends along a locking arm plane, and the bias device plane and the locking arm plane extend at an angle of about 75 degrees or more.

27. The spreader spring of claim 25, wherein the retraction arm includes an angled portion that connects the retraction arm to the bias device and is angled so that the retraction arm extends towards the locking arm.

28. The spreader spring of claim 25, wherein the axis of each of the two groups of helical loops are oriented so that each of the axes are normal to a direction of retraction.

* * * * *